United States Patent [19]

Franz et al.

[11] 4,316,479
[45] Feb. 23, 1982

[54] VACUUM MODULATOR VALVE AND SUBASSEMBLY THEREFOR

[75] Inventors: Rudolph J. Franz, Schaumburg; Dennis DeVera, Mundelein, both of Ill.; James A. Dahlstrom, Versailles, Ohio

[73] Assignee: Eaton Corporation, Cleveland, Ohio

[21] Appl. No.: 88,806

[22] Filed: Oct. 29, 1979

[51] Int. Cl.³ ............................................. G05D 16/00
[52] U.S. Cl. ........................................ 137/85; 236/13
[58] Field of Search ............... 137/85, 82, 86; 236/13, 236/49, 87

[56] References Cited

U.S. PATENT DOCUMENTS 4,245,780  1/1981  Franz ................................. 236/13

Primary Examiner—Alan Cohan
Attorney, Agent, or Firm—C. H. Grace; R. A. Johnston

[57] ABSTRACT

A vacuum regulator valve (10) is disclosed comprising a force-balance modulator valve subassembly (114, 118, 119, 122, 124, 126) mounted to a housing (12, 30) having inlet (14) and outlet (16) fluid ports. A vent insert (114) is adjustably biased through a biasing spring (166) by a rotary cam arrangement which includes a spring (64) biased rotary input member (48) rotatably mounted on a housing tubular projection (40). A ring-shaped drive member (144) is rotatable with input member (48) and supports a cup-shaped cam member (154). As projections (152) on the reaction member (144) rotate relative to cam surfaces (160), the cam follower is moved lineally relative to the vent insert. Locking tabs (50, 146, 148, 150) and alignment grooves (46, 80, 96, 98) enable the cam arrangement to be assembled in a predetermined angular position and locked to the housing without fasteners. An externally accessible adjustment member (162) enables valve calibration after final assembly. A dish-shaped spring (138) reacts against the vent insert and plate members (134, 136) for stabilizing and centering the vent insert.

13 Claims, 10 Drawing Figures

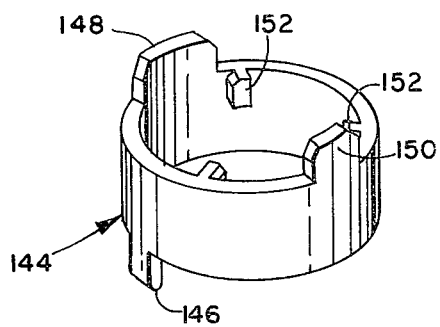
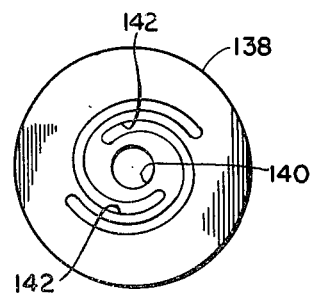
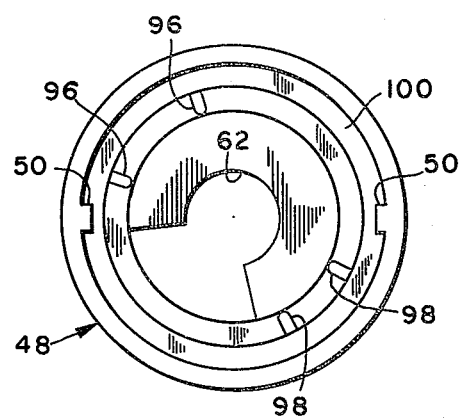
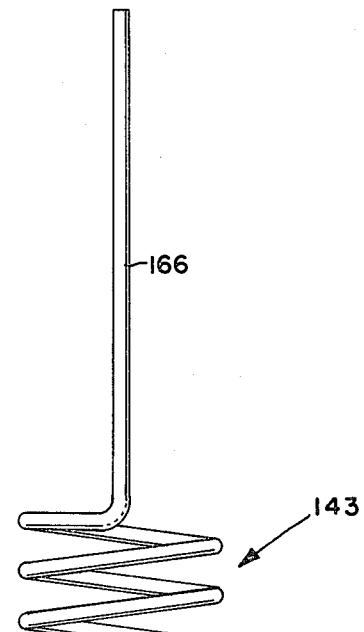
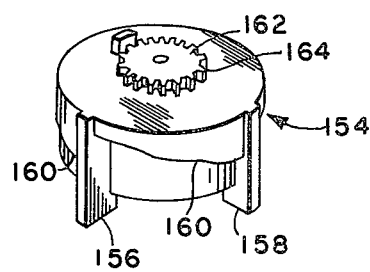
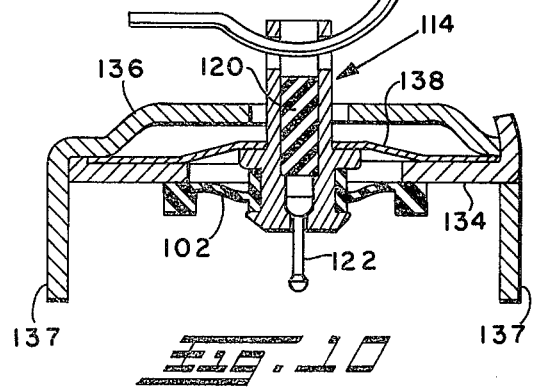

VACUUM MODULATOR VALVE AND SUBASSEMBLY THEREFOR

BACKGROUND OF THE INVENTION

The present invention relates to fluid valves for providing a modulated vacuum output signal in response to a rotary mechanical input, and is particularly directed to vacuum regulator valves which receive a rotary mechanical input proportional to the fuel metering angle in a fuel injector of an internal combustion engine and supply a modulated vacuum control signal to associated vehicle equipment, for example, transmissions, and exhaust gas recirculation valves.

DESCRIPTION OF THE PRIOR ART

A vacuum regulator valve presently in use in controlling vehicle transmissions incorporates a cam and adjustment which varies the spring biasing load on a pressure responsive diaphragm having a relatively large effective area. As a result of the increased force necessary to vary the position of the diaphragm, the cam surfaces of this valve are prone to excessive wear. Calibration of this valve has also been difficult to achieve and required placing shims under a piston shaped reaction member disposed between the cam surface on a valve rotary input member and one end of a lever arrangement in order to vary the position of diaphragm.

Another performance shortcoming associated with known valves of the aforementioned type is that an output pressure equivalent to atmospheric pressure could not be achieved due to the structural nature of the valve arrangement. Since this particular type prior art valve can not achieve a pressure signal output equivalent to atmospheric pressure, for automotive transmission applications, a separate solenoid valve is required to shift the vehicle torque converter to a locked in position.

SUMMARY OF THE INVENTION

In the present invention a vacuum regulator valve assembly and subassembly therefor is provided having a rotary actuated cam adjustment feature which produces lineal output movement for biasing the direction of movement of a force-balance type fluid flow modulating valve arrangement.

Changes in the biasing of the modulator valve are made by altering the tension on a biasing spring connected between a cam follower member and an atmospheric vent insert mounted integrally with a flexible diaphragm. The valve subassembly, which has a fluid chamber defined by the valve housing and the diaphragm, includes a dumbbell-shaped valve member having valve surfaces on each end which are positionable relative to corresponding valve seats located around an atmospheric vent passage in the vent insert and a housing fluid passageway connectable to a vacuum source. The diaphragm reaches a position of force equilibrium wherein the upward biasing force of the spring is balanced by the differential of pressure between atmospheric and the pressure in the chamber acting on the diaphragm as developed by the position of the valve member relative to the valve seat around the vacuum source passageway.

A uniquely arranged disc-shaped spring, designated a secondary spring, exerts a downward force on the vent insert and functions, in cooperation with the biasing spring, to stabilize the resultant equilibrium position of the vent insert, thus making the valve relatively insensitive to vibration. The disc spring also centers the vent insert for insuring alignment of the dumbbell valve member relative to corresponding valve seats.

Another unique feature of the invention is a subassembly comprising the secondary spring captured around its periphery between upper and lower support plates. The vent insert with the diaphragm mounted thereon extends through central openings in the secondary spring and support plates and is maintained in position by a looped end on the biasing spring. This subassembly can be easily and quickly assembled to the valve housing by insertion into alignment slots formed in the housing. Downwardly extending tabs on the upper support plate are crimped over the outer surface of the housing to secure the subassembly to the housing.

The rotary cam adjustment means includes a cup-shaped input member guided for rotation on a tubular portion of the housing. Rotation of the input member is transferred to a tubular drive member which has a plurality of support tabs or stops extending radially inward from the internal circumference thereof. A cam member is partially received within the drive member and has a plurality of cam surfaces, each of which is engageable with one of the drive member tabs. As the drive member rotates, the cam member is moved lineally, thus enabling the force of the biasing spring to be adjusted. The rotary input member is spring biased for rotation in a preselected direction or sense by a torsion spring which has one end connected to a notch located in a predetermined position on the input member and the other end connected to the valve housing. A reference position for the rotary input member in the unactuated position is established by an alignment tab on the drive member which engages with an arcuate slot formed by outer and inner tabular portions of the housing. Dissimilarly shaped tabs extend upwardly from the ring shaped drive member and extend into corresponding key slots in the rotary input member, thereby insuring that mounting surfaces on the upper face thereof are in a predetermined angular position.

Assembly of the rotary input member is further aided by locating tabs which align with longitudinal slots in the valve housing. The tabs snap into transversely extending grooves for axially retaining the input member to the housing and additionally capturing the reaction member and cam member without the need for separate fasteners or fastening operations.

An externally accessible adjustment nut is threadedly received in the cam member and permits precise calibration of the spring biasing force.

It is an object of the invention to provide a vacuum modulator valve which supplies a precise vacuum signal in response to a mechanical rotational input.

It is another object of the invention to provide a pneumatic modulator valve which can be precisely calibrated after final assembly of the valve.

It is still another object of the invention to provide a modulator valve which is relatively insensitive to the effects of engine vibration.

It is an object of the invention to provide a subassembly which is insertable into a valve housing of a force-balance modulator valve for valve operation.

It is an object of the invention to provide a rotary cam actuation arrangement which can be assembled to the valve housing in an axial sequence and which is retained in assembly by snap-locking interengagement.

It is an object of the invention to provide a vacuum modulator valve assembly which includes a valve subassembly and a rotary cam arrangement that can be assembled to the valve housing from a single direction and locked into place without the need for separate fasteners.

BRIEF DESCRIPTION OF THE DRAWINGS

FIG. 4 is a top view in elevation of the valve housing;

FIG. 5 is a perspective view of the drive member;

FIG. 6 is a front elevational view of the secondary spring;

FIG. 7 is a bottom view in elevation of the rotary input member;

FIG. 8 is a perspective view of the cam member and adjusting gear;

FIG. 10 is a partial cross-sectional view of a subassembly for a force-balance type modulator valve.

DETAILED DESCRIPTION

Figure 1:
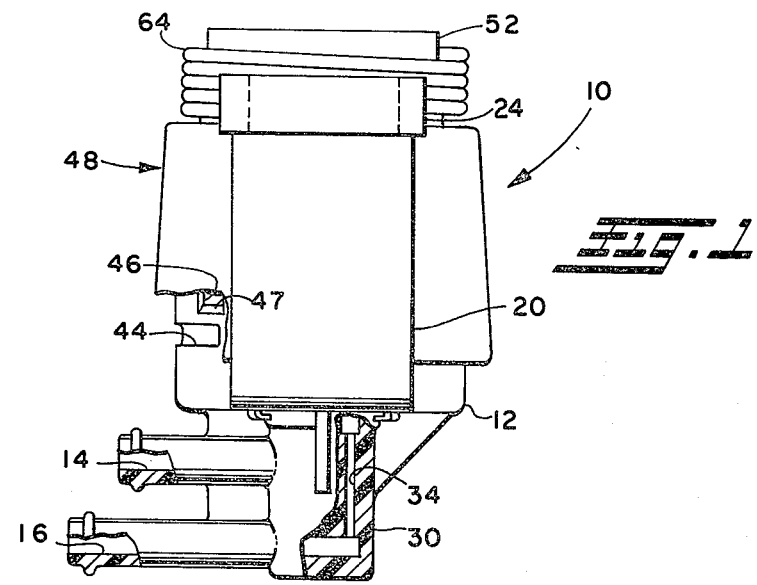
FIG. 1 is a side view in elevation of a modulator valve embodying the principles of the invention.
Figure 2:
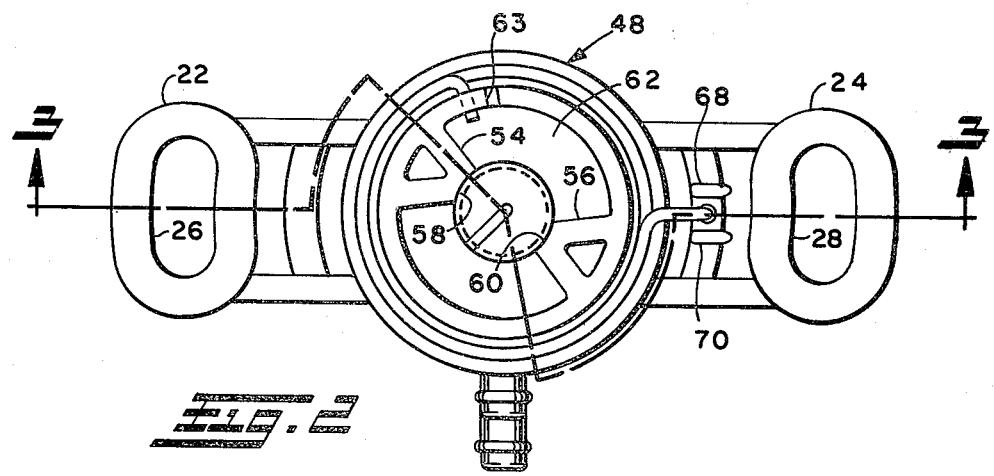
FIG. 2 is a top view in elevation taken relative to FIG. 1.
Figure 3:
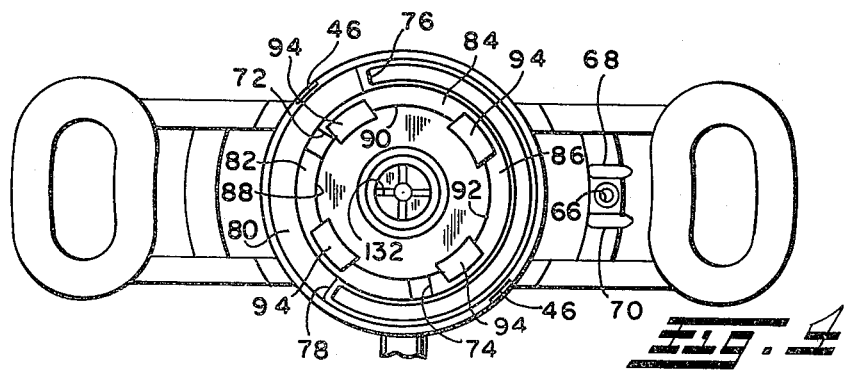
FIG. 3 is a cross-sectional view taken along section indicating lines 2—2 of FIG. 2.
Figure 3:
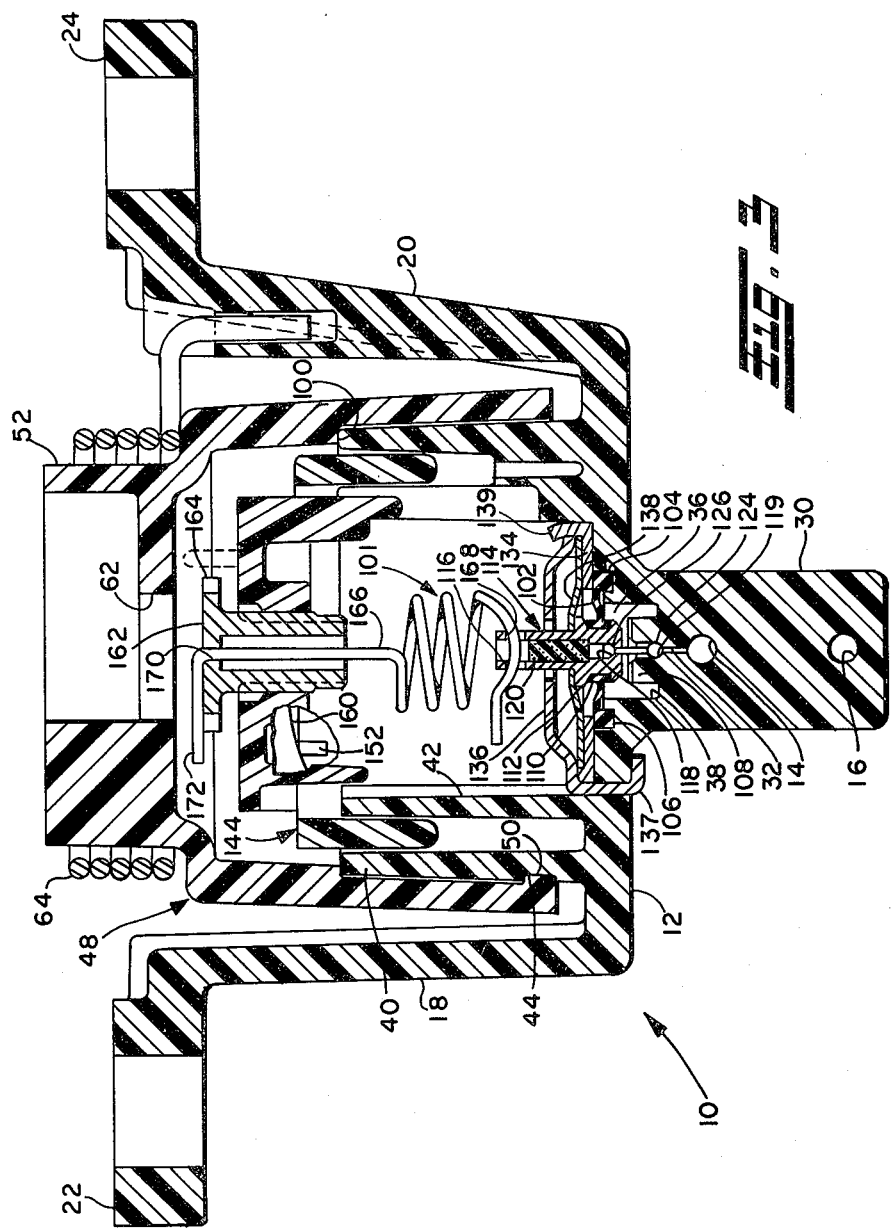
Figure 9:
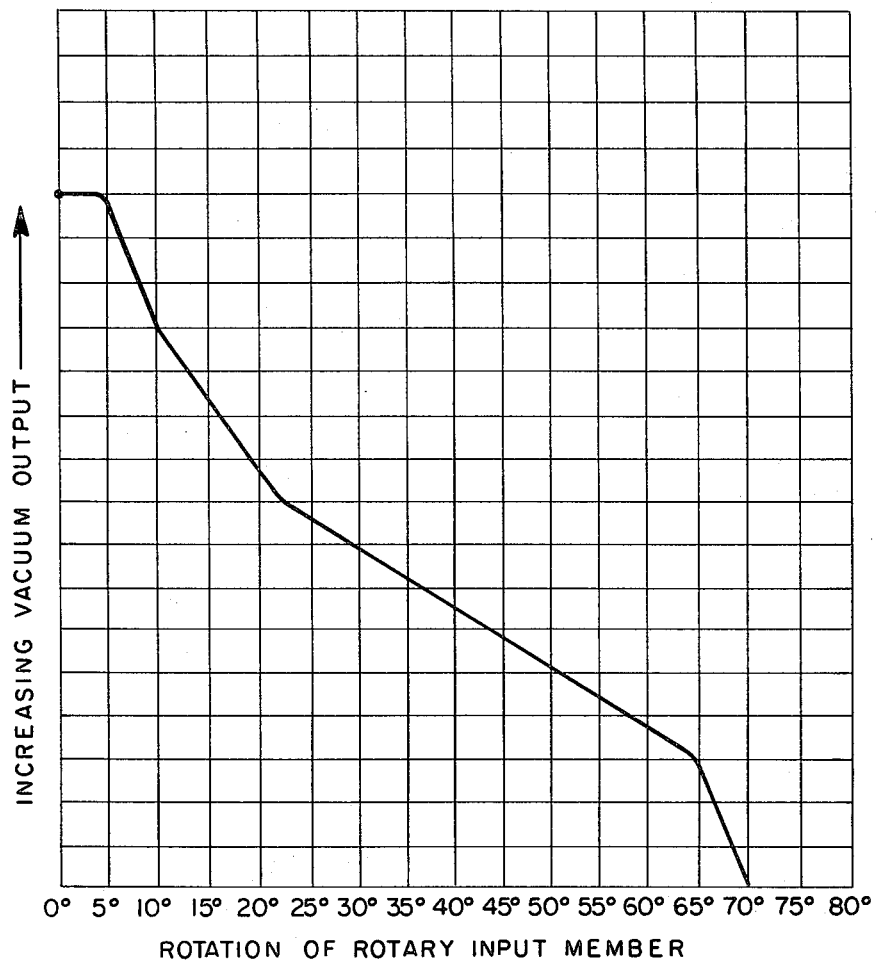
FIG. 9 is a typical plot of valve vacuum output versus clockwise rotation of the rotary input member.

Referring now to FIGS. 1-3, there is indicated generally at 10 a vacuum modulator valve embodying the principles of the invention having a valve housing 12 which defines a fluid inlet port 14, a fluid outlet port 16, and mounting legs 18 and 20 which extend from the base of the housing. Mounting tabs 22 and 24 having screw slots 26 and 28, respectively, are formed on the ends of the legs for connecting the valve to a suitable engine location (not shown). A boss 30 extends from the base of housing 12 and has integrally molded therein a vertically extending inlet fluid passageway 32 and outlet fluid passageway 34. Passageways 32 and 34 terminate at their upper ends in a fluid chamber 36 formed partially by a bore 38 formed into the top surface of the housing base and a portion of boss 30.

Referring now to FIG. 3, an outer tubular section 40 and an inner tubular section 42 extend upwardly from the base of the housing 12 and are both concentric with bore 38. A pair of axially aligned grooves 44 one of which is shown partially by FIGS. 1 and 3, are formed around the lower outer surface of tubular section 40. A pair of longitudinally extending grooves 46 (FIGS. 1, 4) are spaced approximately 180 degrees apart and formed into the outer surface of tubular section 40. Ramp portions 47 separate grooves 44 and 46 and facilitate assembly, as will be described in greater detail below.

Referring now to FIGS. 3 and 7, a rotary input member having a cup-shaped configuration, indicated generally at 48, is received over and guided by tubular projection 40. A pair of tabs 50 are formed on the lower inside surface of input member 48 and during assembly function to snap from grooves 46 into grooves 44, thereby axially retaining input cup member 48 on projection 40. A reduced diameter portion 52 is formed on the upper end of input member 48. A pair of rib sections 54 and 56 extend radially inward from the internal wall of portion 52 and terminate in cylindrical surface portions 58 and 60, respectively, which define mounting surfaces engageable with an external adjustment member (not shown). A transverse wall segment 62 extends between the sides of ribs 54 and 56.

A torsion spring 64 (FIGS. 1, 3) is positioned around reduced diameter portion 52 and has one end thereof extending into a notch 63 formed in the wall of portion 52 and the other end thereof extending into a hole 66 (FIG. 4). Spring 64 functions to bias input member 48 in a counterclockwise direction as viewed from FIG. 3. Ribs 68 and 70 on either side of hole 66 function to strengthen mounting leg 20 in the area around the hole and also facilitate assembly of the spring therein.

A pair of longitudinally extending slots 72 and 74 (FIG. 4) are formed into the wall of inner tubular section 42. Radial ribs 76 and 78 extend between outer and inner tubular sections 40, 42 and form in combination with inner and outer wall portions of the tubular sections an arcuate slot 80. Thickened wall portions 82, 84, and 86 of tubular section 42 define cylindrical guide surface portions 88, 90, and 92 respectively. Four arcuate slots 94 are formed through the bottom wall of housing 12.

As shown by FIG. 7, two pair of oppositely disposed ribs 96 and 98 are formed on the internal upper wall of input member 48 and function to define alignment slots. A shoulder 100 is formed on the internal surface of input member 48 and functions as a bearing support surface and is engageable with the upper end of outer tubular section 40.

Returning now to FIG. 3, a force-balance type modulator valve assembly, indicated generally by 101, includes a flexible diaphragm 102 having an outer peripheral bead 104 seated in an annular groove 106. A cylindrical portion 108 is formed on the upper end of boss 30 and extends into fluid chamber 36. A bead 110 is formed around the inner periphery of diaphragm 102 and seated in an annular groove 112 formed into a vent insert, indicated generally at 114. A vent passageway 116 is formed through insert 114 and a tapered valve seat 118 is located adjacent the lower end thereof. Valve seat 118 is also designated as a second valve seat. A first valve seat 119 is defined by a tapered surface surrounding the upper end of passageway 32. A filter element 120 is received in vent passageway 116 and functions to prevent contaminants from entering fluid chamber 36.

An elongated valve member 122 extends into vent passageway 116 and has lower and upper enlarged end portions which define first and second valve surfaces, 124 and 126, respectively, on the lower surfaces thereof. In the position as shown by FIG. 3, both first and second valve surfaces 124 and 126 of the valve member are in sealing engagement with the first and second valve seats, thus placing the valve in the neutral position wherein fluid chamber 36 is isolated from atmospheric air and a vacuum source (not shown) connected to inlet port 14.

As shown in FIG. 4, a plurality of radially extending grooves 132 are formed on the upper surface of raised portion 108 and function to permit atmospheric vent flow into fluid chamber 36 when the lower surface of insert 114 abuts the top surface of raised portion 108.

A lower retaining plate 134 is seated over the top surface of housing 12. An upper retaining plate 136 has a plurality of downwardly extending tabs 137 which extend into slots 94 of housing 12. Plate 136 is secured to housing 12 by crimping the tabs over the lower surface of the housing. The compressive load exerted by the crimped connection of the tabs on the lower surface of plate 136 maintains plate 134 in sealing engagement with diaphragm bead 104.

As shown by FIGS. 3 and 6, a disc-shaped spring 138 is supported around its periphery between retainers 134 and 136 and secured therebetween by tabs 139 which are crimped over the outer edge of plate 136. Spring 138 is also designated as a secondary spring. A central opening 140 is formed in spring 138 to permit the upper end of vent insert 114 to extend therethrough. Arcuate slots 142 are stamped into spring 138 for achieving a spring rate suitable for stabilizing and centering movement of insert 114, as will be described subsequently in greater detail.

Referring now to FIG. 10, a subassembly for a force-balance type modulator valve, is indicated generally by reference numeral 143 and comprises diaphragm 102, vent insert 114, filter 120, valve member 122, upper retaining plate 136, lower retaining plate 134, damping spring 138, and biasing spring 166 structurally arranged in a subassembly as set forth above. It should be noted that tabs 137 are shown as extending downwardly to permit insertion in valve housing 12 as will be described subsequently in greater detail.

A secondary spring subassembly is defined by upper and lower plates 136, 134 and secondary spring 138. This "spring capsule" construction greatly simplifies assembly of the valve as will be described below in greater detail.

As shown by FIGS. 3 and 5, a tubular drive member, indicated generally at 144, has its lower portion extending into the space between outer and inner tubular sections 40 and 42 and has its bottom edge registering against the top surface of ribs 76 and 78. A tab 146 extends from the lower edge of drive member 144 and extends into arcuate slot 80 and functions to limit the angular displacement of drive member 144 relative to housing 12. Tabs 148 and 150 (FIG. 5) extend upwardly from the upper edge of the drive member and register between pairs of ribs 96 and 98, respectively, for linking rotary input member 48 thereto. Three equally spaced radial projections 152 or stop surfaces are formed on the upper inside surface of drive member 144 and function as cam support surfaces.

A cam member, (FIGS. 3, 8) indicated generally at 154, has a cup-shaped configuration and extends partially within drive member 144 and inner tubular extension 42. A pair of longitudinally extending ribs 156 and 158 project radially outward from the side walls of the follower and are slidably received within slots 72 and 74 of housing 12. Three cam surfaces 160, two of which are shown by FIG. 8, extend downwardly from the top surface of the cam member and are engageable with the top surfaces of projections 152.

In the preferred form of the invention housing 12, cam follower member 154, and rotary input member 48 are molded from a glass-filled nylon material while reaction member 144 is molded from a thermoplastic comprising nylon and polytetrafluoroethylene. It should be noted, however, that alternate materials may be used without departing from the scope of the invention.

An adjustment insert 162 is threadedly received in cam member 154 and has gear teeth 164 formed around an upper flanged portion.

A biasing spring 166 (FIG. 3) has its lower end connected through a transverse hole 168 formed in the upper end of vent insert 114 and its upper end extending through a hole 170 formed in adjustment insert 162 and secured thereto by a right angle bend portion 172. An upwardly extending post 174 is formed on the top surface of insert 162 adjacent gear teeth 164. In the presently preferred practice, after final calibration of the valve 10, rotation of insert 162 relative to cam member 154 is secured by a suitable expedient as, for example, an adhesive deposit over the post and gear teeth.

In assembly, subassembly 143 (FIG. 10), which includes the spring capsule subassembly (134, 136, 138), is suspended over housing 12 by spring 166 and inserted into the opening defined by internal tubular projection 42 such that downwardly extending tabs 137 are aligned with and extend through slots 94 after which tabs 137 are crimped inwardly over the lower surface of housing 12 as illustrated by FIG. 3. Drive member 144 is then inserted into the space between the outer and inner tubular sections 40 and 42 such that tab 146 extends into arcuate slot 80. Cam member 154 is then positioned such that cam surfaces 160 are supported by projections 152 and ribs 156 and 158 are aligned with and received in slots 72 and 74, respectively. The upper end of biasing spring 166 is inserted through hole 170 formed in adjustment insert 162.

Prior to assembly of rotary input member 48 to the housing 12, reaction member 144 is rotated counter-clockwise as viewed from FIGS. 3 and 4 until tab 146 abuts rib 78. This step aligns tabs 148 and 150 relative to longitudinal grooves 46. Rotary input member 48 is aligned over housing 12 with notch 63 aligned generally as shown by FIG. 3 so that tabs 50 are aligned with longitudinal slots 46 formed in outer tubular projection 40 (FIG. 4). Input cup member 48 is then pressed downwardly until tabs 50 snap over ramp portions 47 into grooves 46 thereby locking the rotary cam arrangement in the position as shown by FIG. 3.

In the presently preferred practice the vacuum regulator vavle 10 is preferably calibrated by first applying a suitable negative pressure such as below atmospheric pressure to inlet port 14 and then applying a load to biasing spring 166 until the desired output at outlet port below atmospheric pressure is attained. The upper end of biasing spring 166 is then bent over the top of adjustment insert 162. The vacuum regulator valve assembly 10 is then heat stabilized by soaking at a suitable temperature after which final calibration is made by rotating input member 48 clockwise as viewed in FIG. 3 and adjusting adjustment insert 162 by inserting an adjustment pinion (not shown) into engagement with gear teeth 164 and rotating insert 162 until a desired pressure below atmospheric pressure is attained at vacuum output port 16.

In operation, rotary input member 48 receives an angular displacement relative to housing 12 which is proportional to movement of an associated engine component, not shown. Rotation of the input member is transferred to drive member 144 resulting in rotation of projections 152 which are in engagement with cam surfaces 160 of cam member 154. Longitudinal ribs 156 and 158 prevent the cam member from rotating along with projections 152 but do cause cam member translation lineally toward or away from vent insert 114. Movement of cam member 154 results in the biasing effect of spring 166 being increased or decreased depending upon the direction of rotation of input member 48. As the biasing force of spring 166 is increased, insert 114 is raised.

Valve member 122 and its lower second valve surface 124 are then spaced from valve seat 119, thereby communicating inlet port 114 with fluid outlet port 16. Valve member 122 will remain open until the downward force due to the pressure differential acting on diaphragm 102 balances the upward biasing force of spring 166. The vacuum level thus established in fluid chamber 36 is thereafter maintained at a constant predetermined value. If the vacuum level drops below the predetermined value for the given angular setting of rotary input 48, vent insert 114 will be moved downwardly, allowing atmospheric venting into chamber 36 by spacing of upper valve surface 126 from valve seat 118.

What is claimed is:

1. A vacuum modulator valve assembly, comprising:
   (a) housing means, said housing means including means defining,
      (i) an inlet port adapted for connection to a vacuum source,
      (ii) an outlet port;
   (b) modulator vavle means operably connected to said housing means, said modulator means defining in cooperation with said housing means a fluid chamber in fluid communication with said inlet port and said outlet port, said modulator valve means including means defining
      (i) force balance valve means having portions disposed within said fluid chamber, said force balance valve means including structure movable to control the fluid pressure within said chamber;
   (c) means for preloading said force balance valve means, said preload means including
      (i) rotary input means for receiving a rotational input, said input means including a cup member received over said housing means and an annular drive member slidably received in said housing means, said drive member being operatively connected to said cup for rotation therewith,
      (ii) axially movable means operatively contacting said drive member movable relative to said housing means in response to rotation of said rotary input means, said axially movable means being operative to vary the preload on said force-balance valve means, wherein said fluid pressure in said chamber acting on said force-balance valve means is operative to balance a preload externally applied thereto such that a modulated vacuum output signal representative of said preload is produced at said outlet port.

2. The valve assembly as defined in claim 1, wherein
   (a) said housing means includes structure defining a tubular portion and further includes structure defining engaging surfaces adapted to be engaged by snap-locking; and
   (b) said cup is received over said tubular portion, said cup including structure operable to snap-lock over said engaging surfaces on said tubular portion for preventing axial removal of said cup therefrom, yet permitting rotation of said cup with respect thereto.

3. The valve assembly as defined in claim 1, wherein
   (a) housing means includes means defining outer and inner tubular portions, said inner tubular portions having at least one longitudinal extending groove formed on the inner surface thereof;
   (b) said cup member is received over said outer tubular member,
   (c) said drive member has a lower portion received in and guided for rotation between said outer and inner tubular projections, said drive member having portions thereof defining a reaction surface about the inner periphery thereof;
   (d) said cup member includes structure for transfering rotation from said cup member to said reaction member;
   (e) said axially movable means includes structure defining a cam in contact with said drive member reaction surface, said axially movable means further including structure engaging with said longitudinal groove in said inner tubular portion for preventing rotation thereof, such that upon rotation of said cup member, said drive member rotates and said reaction surface contacts said cam surfaces, whereupon said axially movable means is moved axially relative to said housing means.

4. The valve assembly as defined in claim 1, wherein
   (a) said cup member includes at least one key slot formed therein,
   (b) said housing means includes means defining a plurality of spaced stops disposed about the inner periphery thereof;
   (c) said annular drive member includes structure defining a first axially projecting tab contacting said stops for limiting angular rotation thereof, said annular drive member further including structure defining a second tab extending in an axially opposing direction from said first tab, said second tab engaging said key slot of cup member.

5. The valve assembly defined in claim 2, wherein:
   (a) said housing means includes structure defining at least one guide surface axially disposed of said tubular portion; and,
   (b) said axially movable means includes structure defining a guide portion slidably engaging said guide surface for preventing rotation of said axially movable means with respect to said housing means.

6. The valve assembly defined in claim 1, wherein said preload means includes:
   (a) a primary spring interconnecting said axially movable means and said force-balance valve means; and,
   (b) secondary spring means including structure having portions thereof fixed with respect to said housing means and other portions operatively connected to said force-balance valve means for movement therewith wherein movement of said force-balance valve means with respect to said housing means causes said primary and secondary spring means to alter the bias on said force-balance valve means.

7. The valve assembly defined in claim 6, wherein:
   (a) said housing means includes structure defining at least one guide surface disposed in a direction generally axially of said annular drive member;
   (b) said secondary spring means includes:
      (i) a base plate member having portions thereof slidably engaging said guide surface;
      (ii) a generally dish-shaped spring member having an aperture therein with the outer periphery thereof retained in contact with said base plate member and the periphery of said aperture operatively connected to said force-balance valve means wherein portions of the structure of said force balance means are received through said aperture.

8. The device defined in claim 7 wherein said secondary spring means includes a top plate member having an aperture therein with portions of the structure of said force-balance valve means received therethrough, said top plate member being received over said base plate member for retaining the outer spring member in contact with said base plate member.

9. The valve assembly as defined in claim 1, wherein said axially movable means includes means for calibrating said preload means, said calibrating means including a member having a lower portion threadedly received in said axially movable means, said member having an upper portion, said upper portion having gear teeth formed on the periphery thereof, whereupon rotation of said calibrating means the preload on said force-balance valve means is adjusted independently of rotation of said rotary input means.

10. The valve assembly as defined in claim 9, wherein said cup member includes passageway means through the upper end thereof for gaining access to said calibrating means.

11. A vacuum modulator valve assembly, said assembly comprising,
 (a) housing means, said housing means including structure defining
  (i) an inlet fluid port,
  (ii) an outlet fluid port,
  (iii) a first valve seat formed around one end of said inlet port,
  (iv) and a fluid chamber in fluid communication with said inlet port, said outlet port, and said first valve seat;
 (b) valve means, said valve means including
  (i) a valve member having first and second spaced valve surfaces,
  (ii) resilient diaphragm means having a lower surface portion thereof forming a part of said fluid chamber,
  (iii) said diaphragm means defining a vent passage means for communicating said fluid chamber with atmospheric air, said vent passage means defining a second valve seat.
  (iv) said valve member movable with said diaphragm means during which said second valve surface is in sealing engagement with said second valve seat and said first valve surface is spaced from said first valve seat for communicating and modulating fluid flow from said inlet port to said outlet port, said valve member movable to a stationary position in which said first valve surface seats against said first valve seat and said second valve surface seats against said second valve seat;
 (c) primary biasing means connected to said vent means;
 (d) rotary input means operably connected to said housing means and said biasing means, said rotary input means including
  (i) a tubular input member rotatably mounted relative to said housing means,
  (ii) means defining a reaction surface said reaction surface means being rotatable with said tubular input member,
  (iii) cam follower means engageable with said reaction surface means, said cam follower means including structure defining a guide surface engageable with said housing means for providing linear motion of said follower means in response to rotation of said reaction surface means,
  (iv) said biasing means operably connected between said vent passage means and said cam follower means for urging said second valve seat away from said first valve seat.

12. The device as defined in claim 11, further including secondary biasing means operably connected to said vent passage means and said housing means for centering said vent passage means relative to said first valve seat, said secondary biasing means including a disc-shaped spring having a central opening therein.

13. The device as defined in claim 11, further including
 (a) a base plate member having lower peripheral surface portions in contact with said diaphragm means and said housing means;
 (b) a top plate connected to said base plate for supporting said disc-shaped spring therebetween, said top plate having a plurality of retaining tabs extending downwardly from the periphery thereof and extending through openings in said housing means, said tabs crimped over surfaces of said housing means.

* * * * *